(12) United States Patent
Lin

(10) Patent No.: US 7,354,285 B1
(45) Date of Patent: Apr. 8, 2008

(54) CARD INSERTION STRUCTURE OF ELECTRONIC DEVICE

(75) Inventor: Yun-Tang Lin, Taipei (TW)

(73) Assignee: Inventec Corporation, Shih-Lin Dist., Taipei (TW)

( * ) Notice: Subject to any disclaimer, the term of this patent is extended or adjusted under 35 U.S.C. 154(b) by 0 days.

(21) Appl. No.: 11/710,716

(22) Filed: Feb. 26, 2007

(51) Int. Cl.
*H01R 13/62* (2006.01)

(52) U.S. Cl. ...................... 439/160; 439/159

(58) Field of Classification Search ................ 439/160, 439/159, 135
See application file for complete search history.

(56) References Cited

U.S. PATENT DOCUMENTS 7,086,887 B2 * 8/2006 Tsai et al. .................... 439/331

* cited by examiner

*Primary Examiner*—Javaid Nasri
(74) *Attorney, Agent, or Firm*—Morris Manning Martin LLP; Tim Tingkang Xia, Esq.

(57) ABSTRACT

A card insertion structure of an electronic device is provided, which includes an accommodating groove caved in the electronic device, a first cover covered on the accommodating groove, a card slot extending from a wall of the accommodating groove, and a second cover pivotally disposed on the electronic device. The card slot is used for inserting a card such as a subscriber identity module (SIM) card, and the first cover catches the second cover to be in a covered position. When the card is to be ejected, the second cover cannot be pivoted unless the first cover is removed first, and the second cover pushes the card to move outwards when being pivoted, thus achieving the purpose of ejecting the card. Furthermore, due to the catch of the first cover, the card cannot be ejected if the second cover is inappropriately pivoted, thereby avoiding damaging the card.

10 Claims, 10 Drawing Sheets

CARD INSERTION STRUCTURE OF ELECTRONIC DEVICE

BACKGROUND OF THE INVENTION

1. Field of Invention

The present invention relates to a card insertion structure of an electronic device, and more particularly, to a card insertion structure of an electronic device which prevents the card from being ejected in an incorrect way and can eject the card automatically.

2. Related Art

Figure 1A:
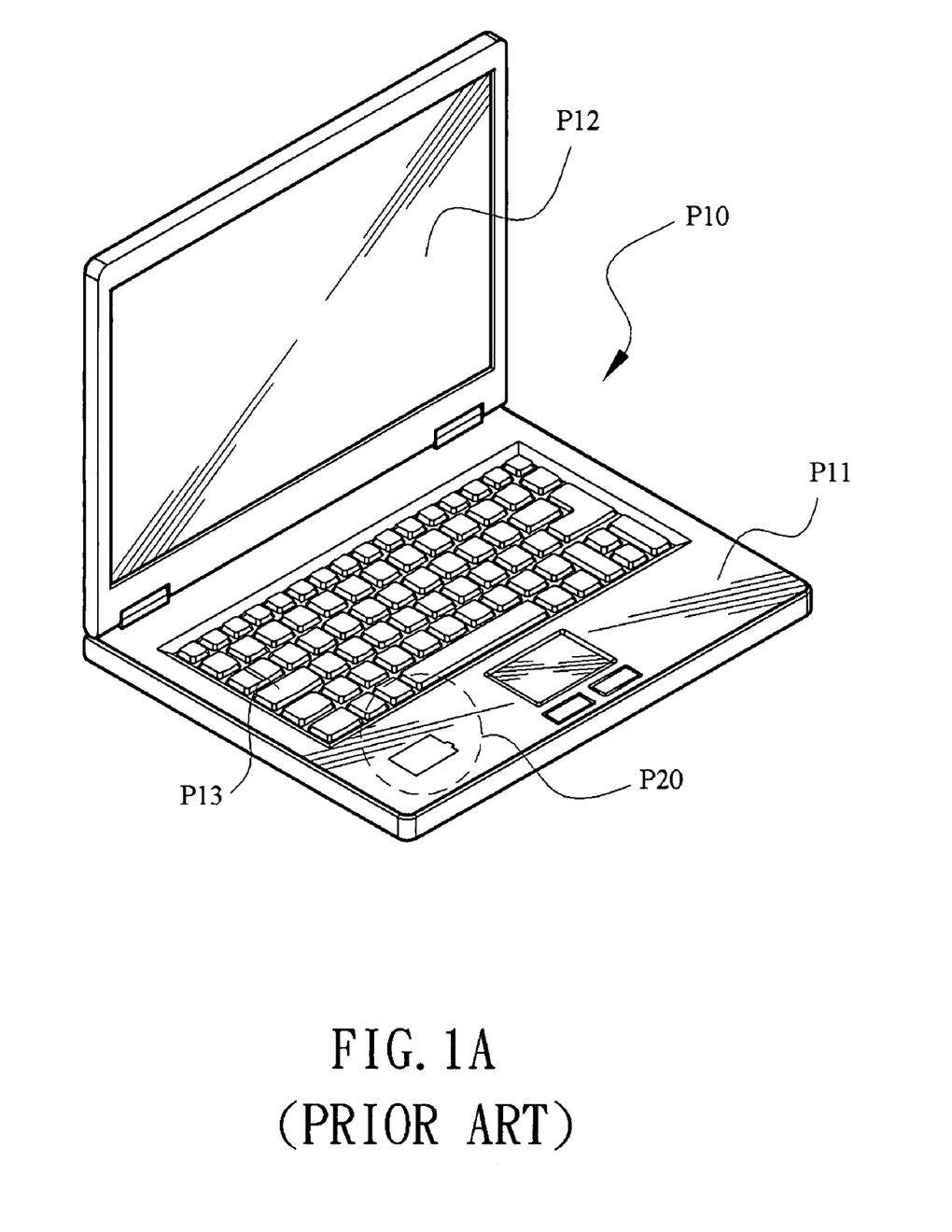
FIG. 1A is a schematic view of a notebook computer with a communication function in the prior art.
Figure 1B:
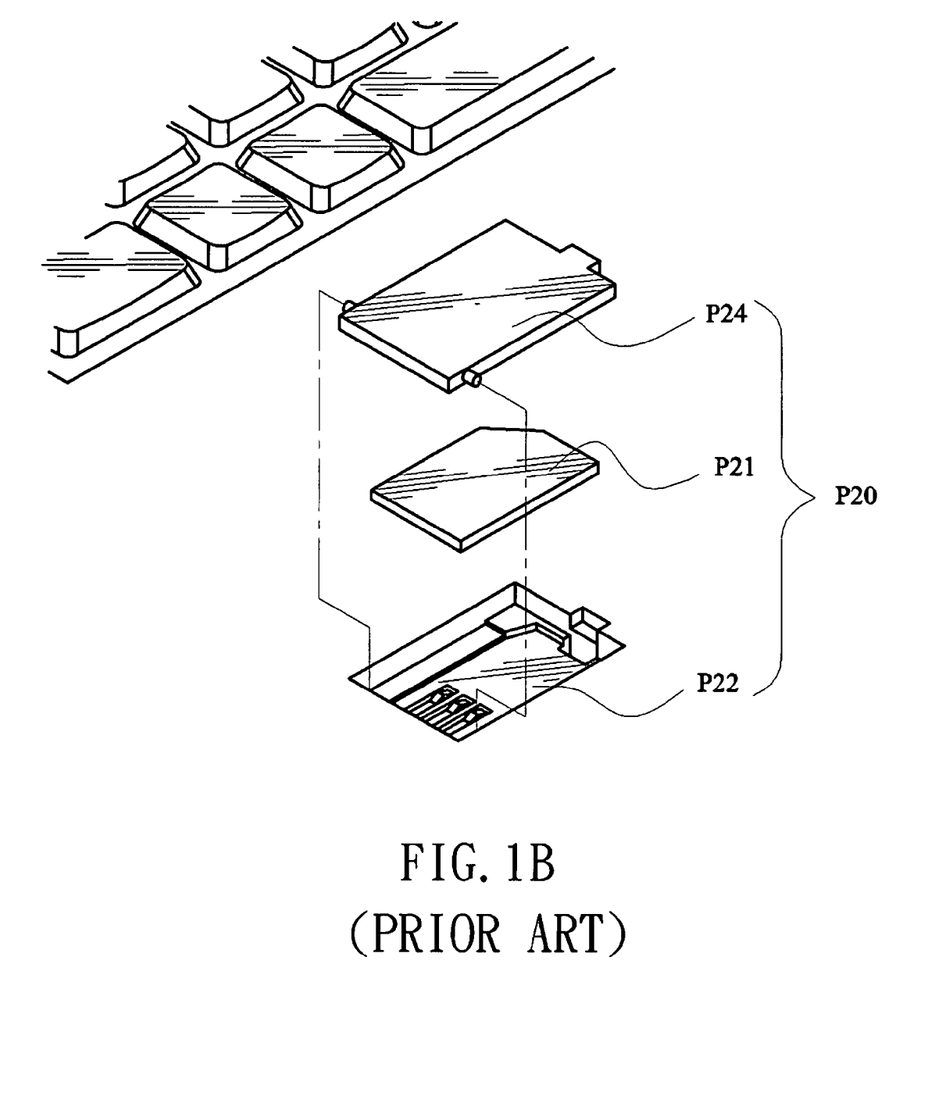
FIG. 1B is a schematic partial enlarged view of the communication function of the conventional notebook computer in FIG. 1A.

Currently, in order to combine a notebook computer with a mobile phone in a more convenient way, a space for directly inserting an SIM card of the mobile phone has been designed in the notebook computer, such that the notebook computer acquires multiple functions of using the mobile phone to surf on the Internet, make a call, and even combine the address books of the two, and so on. With regard to the above design, the following design methods are available in the current market. Referring to FIGS. 1A and 1B, a notebook computer with the aforementioned communication functions in the prior art is shown. Standard accessories, such as a display screen P12 and a keyboard P13, are disposed on a computer casing P11 of the notebook computer P10, and an SIM card receiving slot P20 is formed in the top surface of the computer casing P11. Of course, the SIM card receiving slot P20 may also be formed in a side or bottom surface of the computer casing P11 for receiving an SIM card P21. Moreover, the structure of the SIM card receiving slot P20 includes a recessed portion P22 which can just receive the SIM card P21 used in a conventional GSM communication system. A protection cover P24 is further covered on the recessed portion P22, for surely fixing and pressing the SIM card P21 into the recessed portion P22. However, the arrangement of the SIM card P21 and the SIM card receiving slot P20 may easily cause permanent damage to the SIM card P21 as the SIM card P21 is ejected by a user inadvertently before the notebook computer is powered off. Further, in order to eject the SIM card P21 from the structure of the SIM card receiving slot P20, the protection cover P24 covered thereon must be removed first. In addition, as the SIM card P21 is embedded in the SIM card receiving slot P20, it is inconvenient and difficult for the user to eject the SIM card P21 manually without any tool, which may result in the continuous abrasion of the electrical connection surface of the SIM card P21 during the ejection.

Therefore, in order to solve the disadvantages of the arrangement of the SIM card P21 and the notebook computer P10 and the defect that the SIM card P21 is easily ejected by mistake, it has become a subject matter of the research of the inventor that how to design a portable electronic device with a non-hot-plug card insertion structure that can be ejected automatically, so as to prevent the SIM card P21 from being damaged due to incorrect ejection, and meanwhile enhance the convenience and easiness of a normal ejection process.

SUMMARY OF THE INVENTION

In order to solve the problems of the prior art, the present invention provides a card insertion structure of an electronic device, so as to solve the problem that an SIM card is easily ejected by mistake and then damaged due to the arrangement of the SIM card and a notebook computer, and meanwhile enhance the easiness and convenience of an SIM card ejection process.

In order to achieve the aforementioned objects, the card insertion structure of an electronic device provided by the present invention comprises an accommodating groove caved in the electronic device, a first cover covered on the accommodating groove, a card slot formed by depressing in a wall of the accommodating groove, a second cover pivotally disposed on the electronic device, and a pushing member disposed on the second cover, wherein the second cover is pivoted between a covered position and a card ejection position. When a card is inserted into the card slot, the second cover is pivoted to the covered position, such that the card is in an insertion position of the card slot and electrically connected to the electronic device. Moreover, after being covered on the accommodating groove, the first cover catches the second cover, such that the second cover cannot be opened and thus the card cannot be ejected arbitrarily. On the contrary, after the first cover is removed, the second cover is pivoted from the covered position to the card ejection position, and then the card is pushed by the pushing member to move out of the insertion position, so as to be ejected conveniently.

As the card insertion structure of an electronic device has a mechanism of the first cover catching the second cover to prevent the second cover from being opened arbitrarily, the non-hot-plug card is prevented from being ejected by mistake. Furthermore, when the first cover is replaced with a power supply element or a power supply device comprising the first cover, due to the mechanism of the power supply element catching the second cover to prevent the second cover from being opened arbitrarily, the non-hot-plug card cannot be ejected before the electronic device is normally shut down, thus avoiding permanent damage to the card. The aforementioned non-hot-plug card is, for example, an SIM card, which may be damaged when being ejected by mistake, and thus lose the data stored in the memory. Furthermore, through pivoting the cover to the card ejection position or the covered position, the card is pushed to leave the card slot to be ejected or covered and received in the card slot, thereby enhancing the easiness and convenience of ejecting the card and ensuring the electrically connecting operation state of the card.

In order to make the objects, structural features, and functions of the present invention comprehensible, preferred embodiments accompanied with figures are described in detail below.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 2:
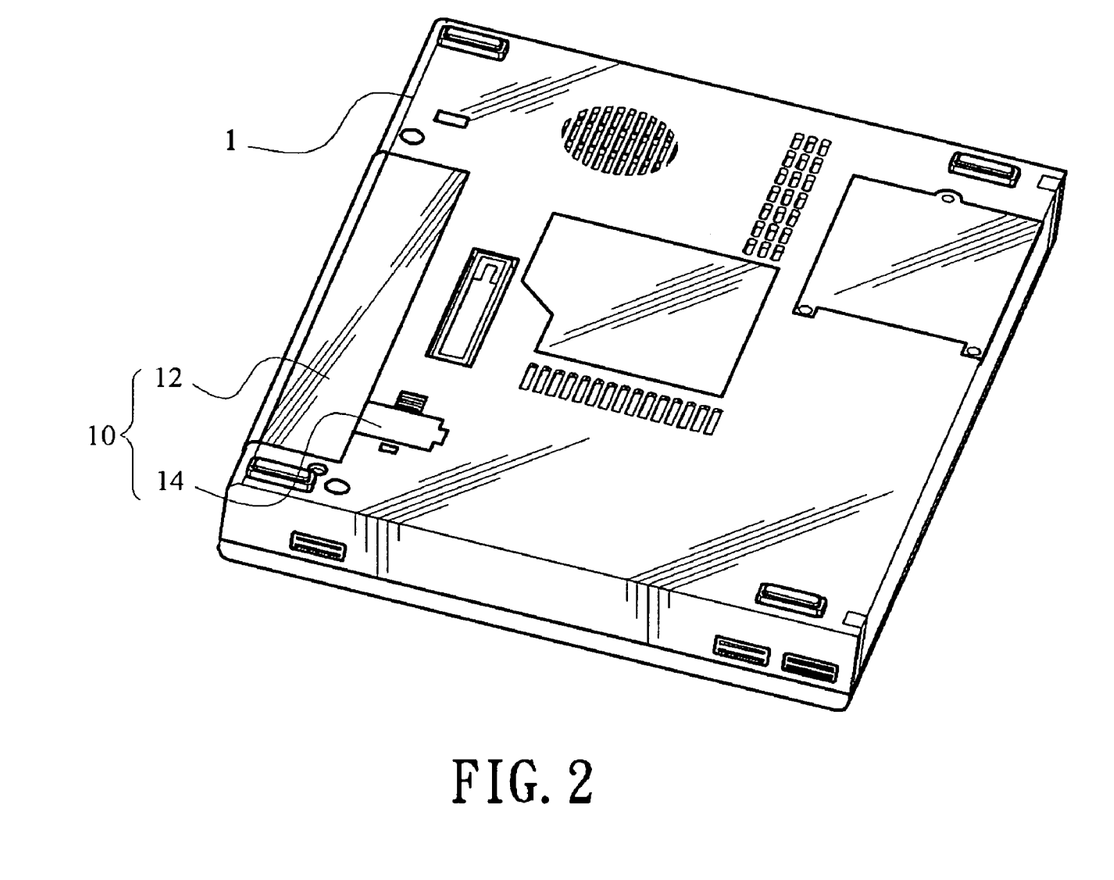
FIG. 2 is a schematic view of a first embodiment of the card insertion structure of an electronic device according to the present invention.
Figure 3:
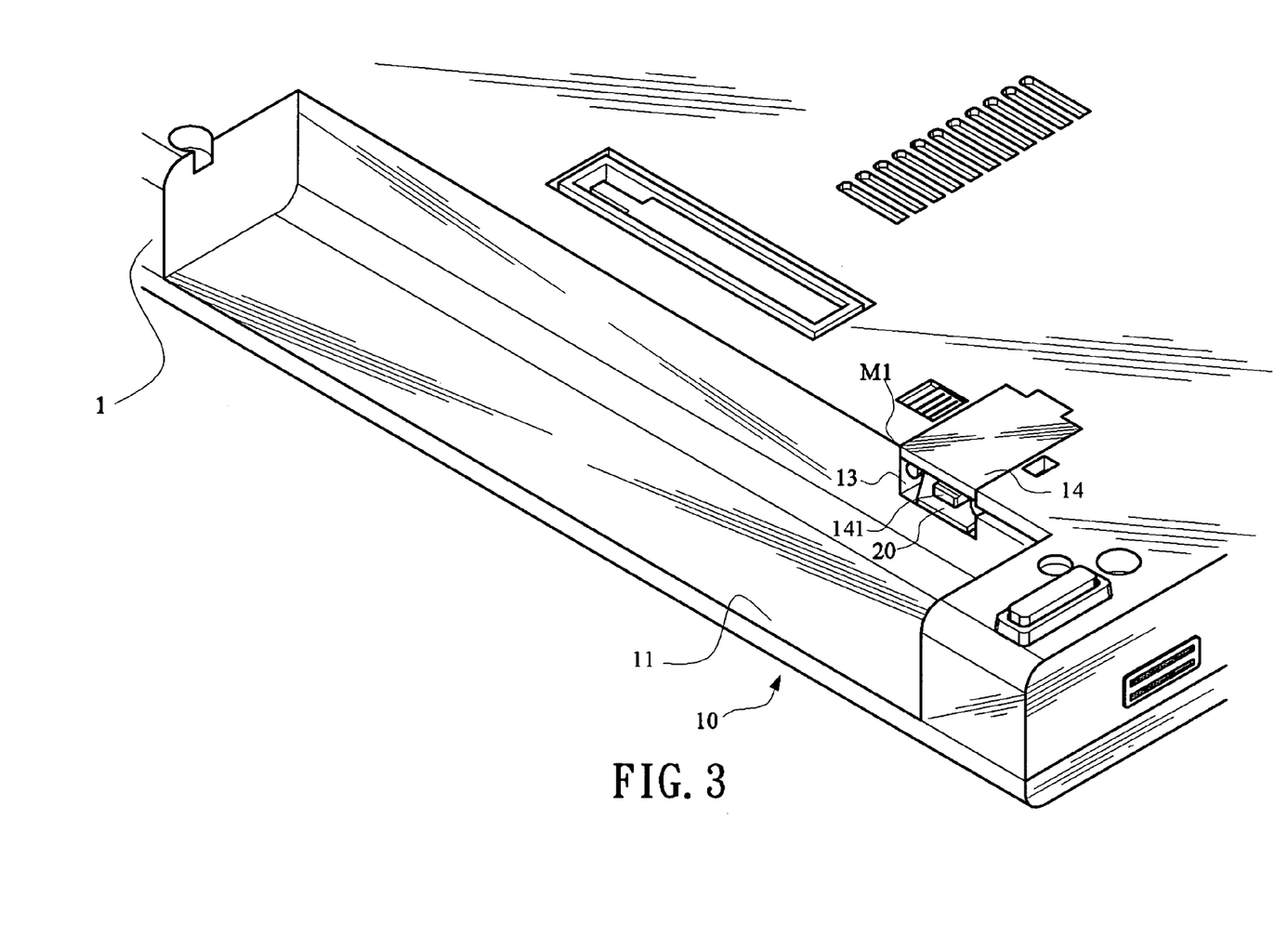
FIG. 3 is a schematic view of the card insertion structure of an electronic device in a covered state according to the present invention.
Figure 4A:
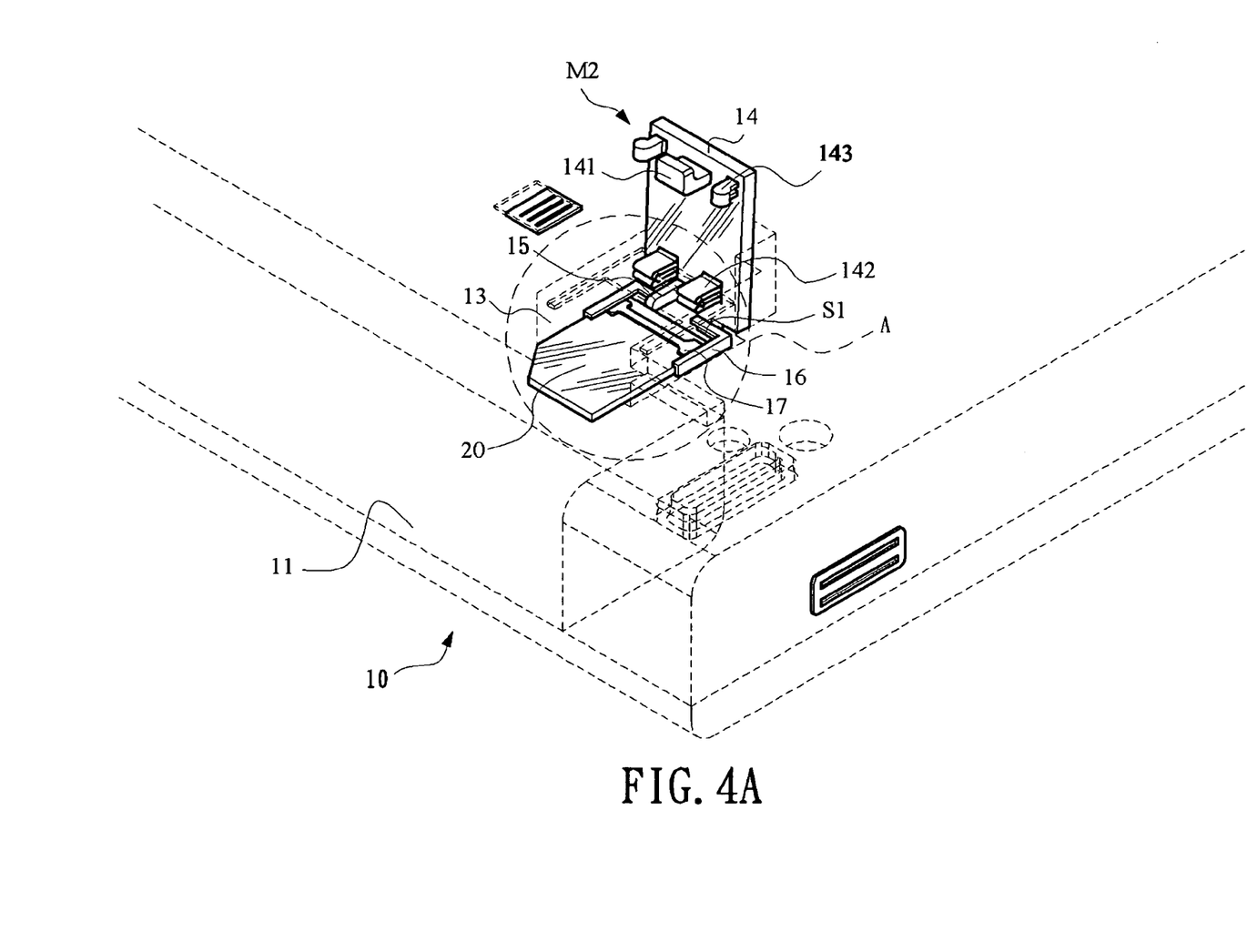
FIG. 4A is a schematic view of the card insertion structure of an electronic device in a card ejection state according to the present invention.
Figure 4B:
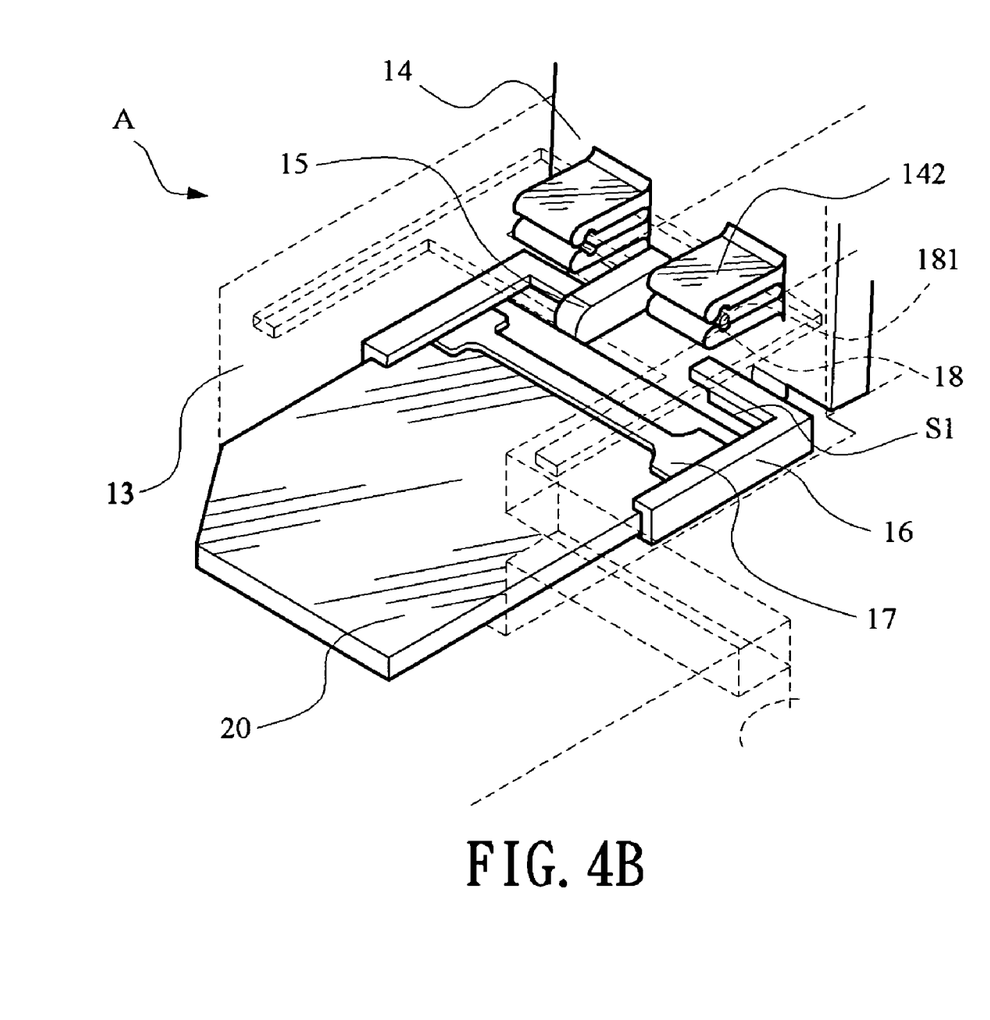
FIG. 4B is a schematic partial enlarged view at Part A of the card insertion structure of an electronic device in FIG. 4A.

Referring to FIGS. 2 and 3, a card insertion structure of an electronic device provided by the present invention is shown, which is used to insert a card 20. The electronic device 1 is, but not limited to, a notebook computer, a desktop computer, a mobile phone, a handheld computer or a personal digital assistant. A first embodiment of the card insertion structure 10 of the electronic device includes an accommodating groove 11, a first cover 12, a card slot 13, and a second cover 14, wherein the accommodating groove 11 is caved in the electronic device 1, and the first cover 12 is covered on the accommodating groove 11. Referring to FIGS. 4A and 4B, the card slot 13 is formed by depressing in a wall of the accommodating groove 11, and makes the card 20 inserted into an insertion position S1. Herein, the insertion position S1 refers to a position that the card 20 is completely inserted therein and electrically connected to the electronic device 1. In this manner, the electronic device 1 may be used as a base to access data in the card, for example, identifying and determining the basic data or identity of a user, calling, and call answering.

Referring to FIGS. 2 and 3, the second cover 14 is pivotally disposed on the electronic device 1 and pivoted between a covered position M1 and a card ejection position M2. Therefore, when the first cover 12 is covered on the accommodating groove 11, the first cover 12 catches the second cover 14 to be in the covered position M1. That is, the second cover 14 has a stopper 141 extending towards the accommodating groove 11 and caught by the first cover 12 when the first cover 12 is covered on the accommodating groove 11, so as to make the second cover 14 in the covered position M1. At this point, being in the insertion position S1, the card 20 is electrically connected to the electronic device 1 as described above. Further, as the second cover 14 is caught by the first cover 12, the second cover 14 cannot be pivoted when the first cover 12 is in a covered state, and of course the card 20 cannot be ejected arbitrarily.

Figure 5A:
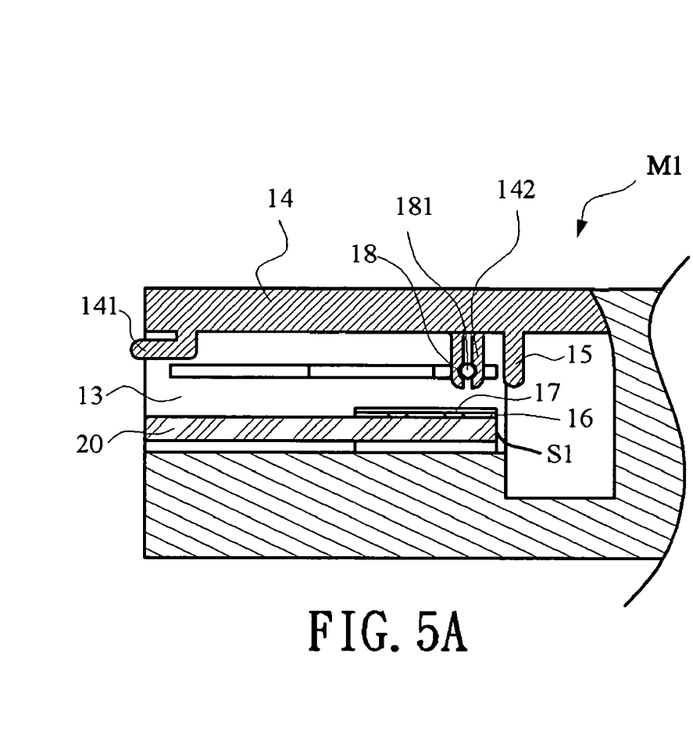
FIGS. 5A to 5C are schematic sectional views of the operation of the card insertion structure of an electronic device according to the present invention.
Figure 5B:
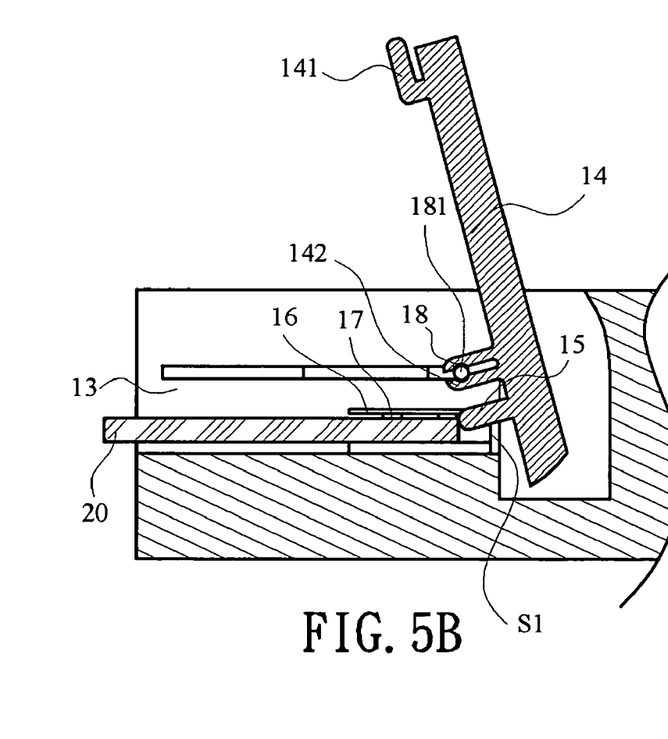
Figure 5C:
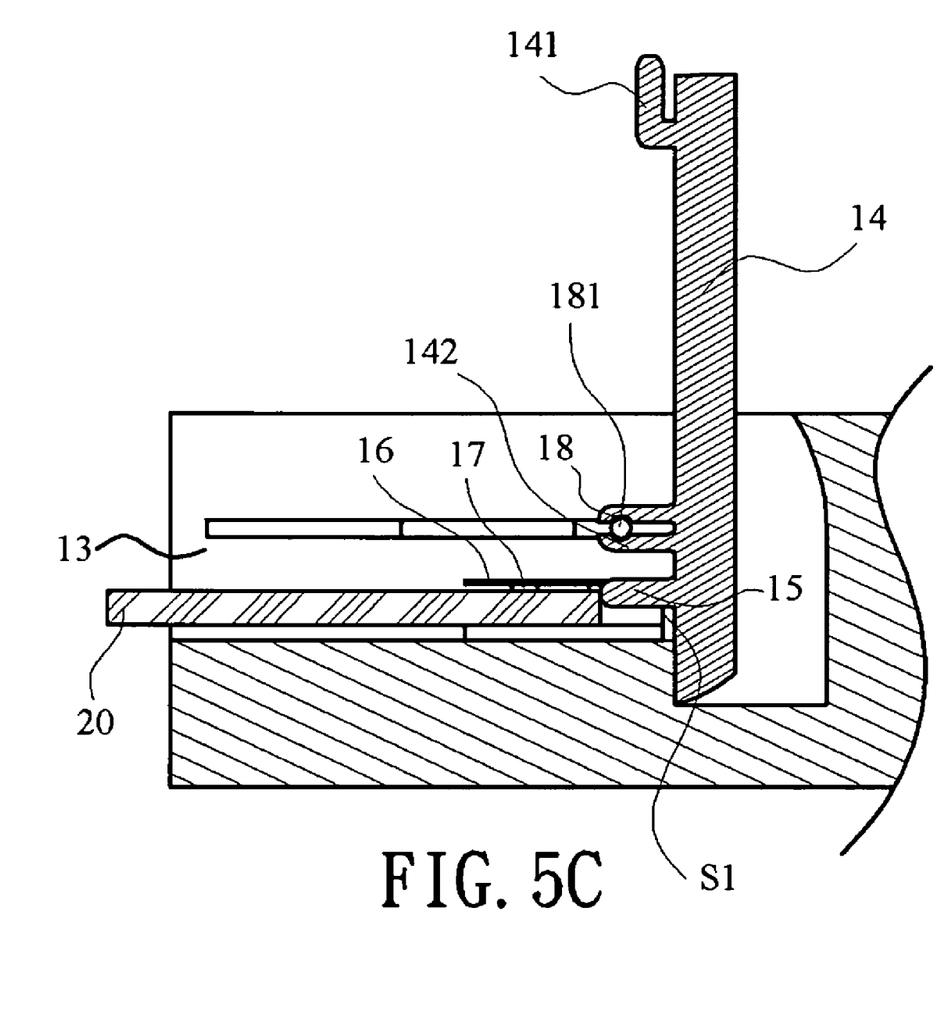

Referring to FIGS. 4A, 5A, and 5B, the card insertion structure 10 of the electronic device further includes a pushing member 15 disposed on the second cover 14. Furthermore, when the second cover 14 is pivoted from the covered position M1 to the card ejection position M2 (as shown in FIG. 5C), the card 20 is pushed by the pushing member 15 to move out of the insertion position S1, i.e., the card 20 is moved out of the insertion position where the card 20 is completely inserted, and thus is not electrically connected to the electronic device 1. Of course, at this point, the electronic device 1 cannot access the data in the card 20. More specifically, during the process that the second cover 14 is pivoted from the covered position M1 to the card ejection position M2, the pushing member 15 begins to push the card 20 to move out of the insertion position S1, as shown in FIG. 5B. In addition, the card insertion structure 10 of the electronic device further includes at least one guide block 16 and at least one blade spring 17 disposed in the card slot 13, or the at least one blade spring 17 spanning the guide block 16. As such, the guide block 16 guides the card 20 to enter and be inserted into the card slot 13, and the blade spring 17 presses the card 20 into the insertion position S1.

Referring to FIGS. 4B and 5A, the second cover 14 is pivotally disposed on the electronic device 1. The second cover 14 has at least one clamping portion 142, which, preferably, extends towards the accommodating groove 11. A through hole 18 is formed in the electronic device 1 for a rotating shaft 181 to pass through, and is preferably formed above the card slot 13 corresponding to the clamping portion 142, such that the clamping portion 142 clamps the rotating shaft 181 and thus the second cover 14 is pivoted between the covered position M1 and the card ejection position M2 (as shown in FIG. 5C). In addition, referring to FIG. 4A again, the second cover 14 further includes at least one hook portion 143, which, preferably, extends towards both sides of the card slot 13, and is fastened to the card slot 13 when the first cover 12 is covered on the accommodating groove 11, thereby making the second cover 14 in the covered position M1.

Figure 6:
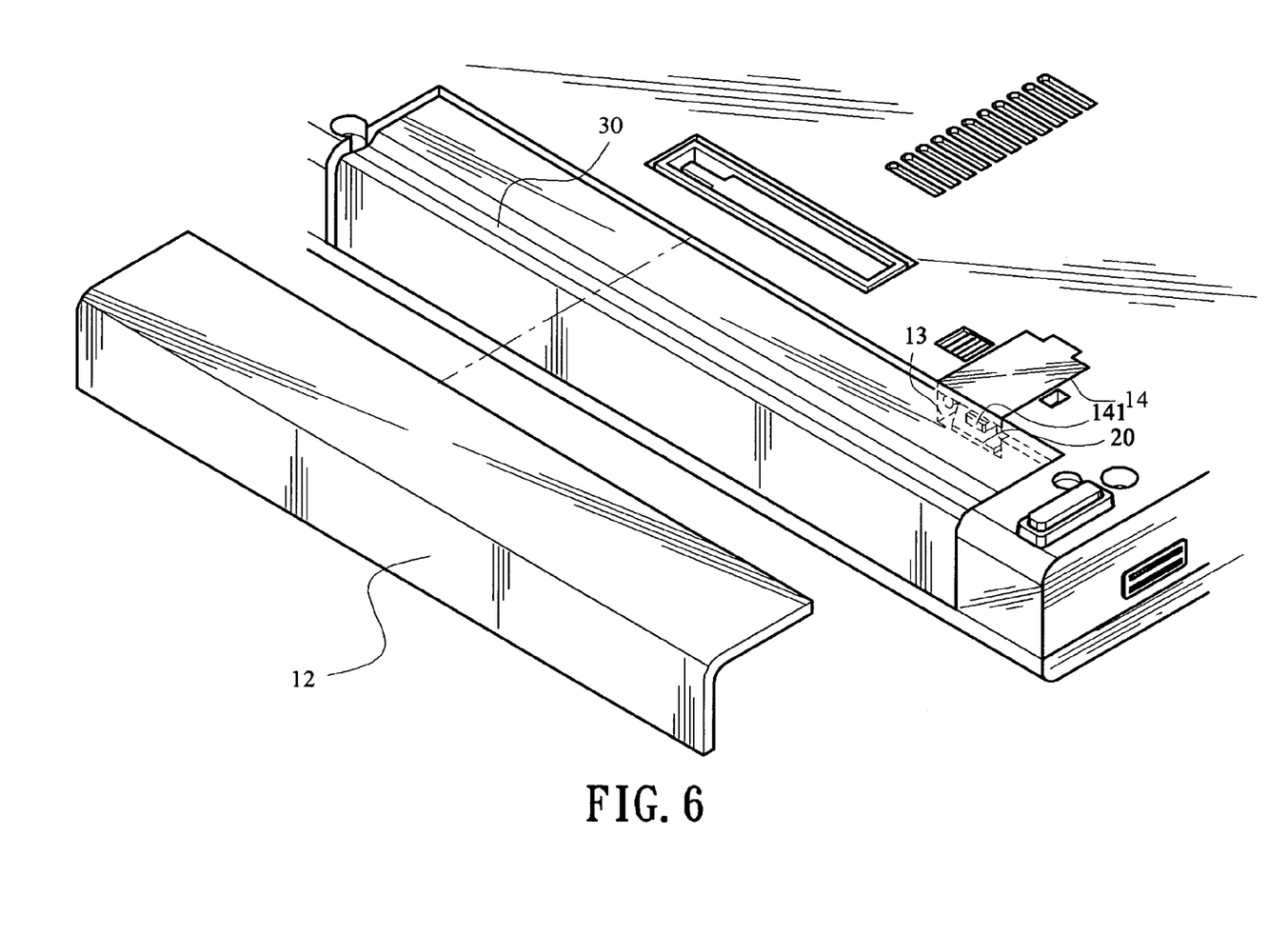
FIG. 6 is a schematic view of a second embodiment of the card insertion structure of an electronic device according to the present invention.

Further, referring to FIG. 6, following the card insertion structure of the above electronic device, the second embodiment of the card insertion structure 10 of the electronic device further includes a power supply element 30 accommodated in the accommodating groove 11, so as to provide power for the operation of the electronic device 1. The first cover 12 may be, but not limited to, formed by extending from the casing of the power supply element 30. Therefore, likewise, when the power supply element 30 is in the accommodating groove 11, the first cover 12 covered thereon catches the second cover 14 to be in the covered position M1, such that the second cover 14 cannot be pivoted when the first cover 12 is in the covered state and even when the first cover 12 is not in the covered state, the second cover 14 is still kept from being pivoted as the power supply element 30 is accommodated in the accommodating groove 11, so as to prevent the card 20 from being ejected arbitrarily. Furthermore, when the second cover 14 is pivoted from the covered position M1 to the card ejection position M2, the pushing member 15 pushes the card 20 to move out of the insertion position S1. At this point, the power supply element 30 of the electronic device 1 is removed first and thus the electronic device is shut down, so the card 20 may not be damaged when being ejected.

Figure 7:
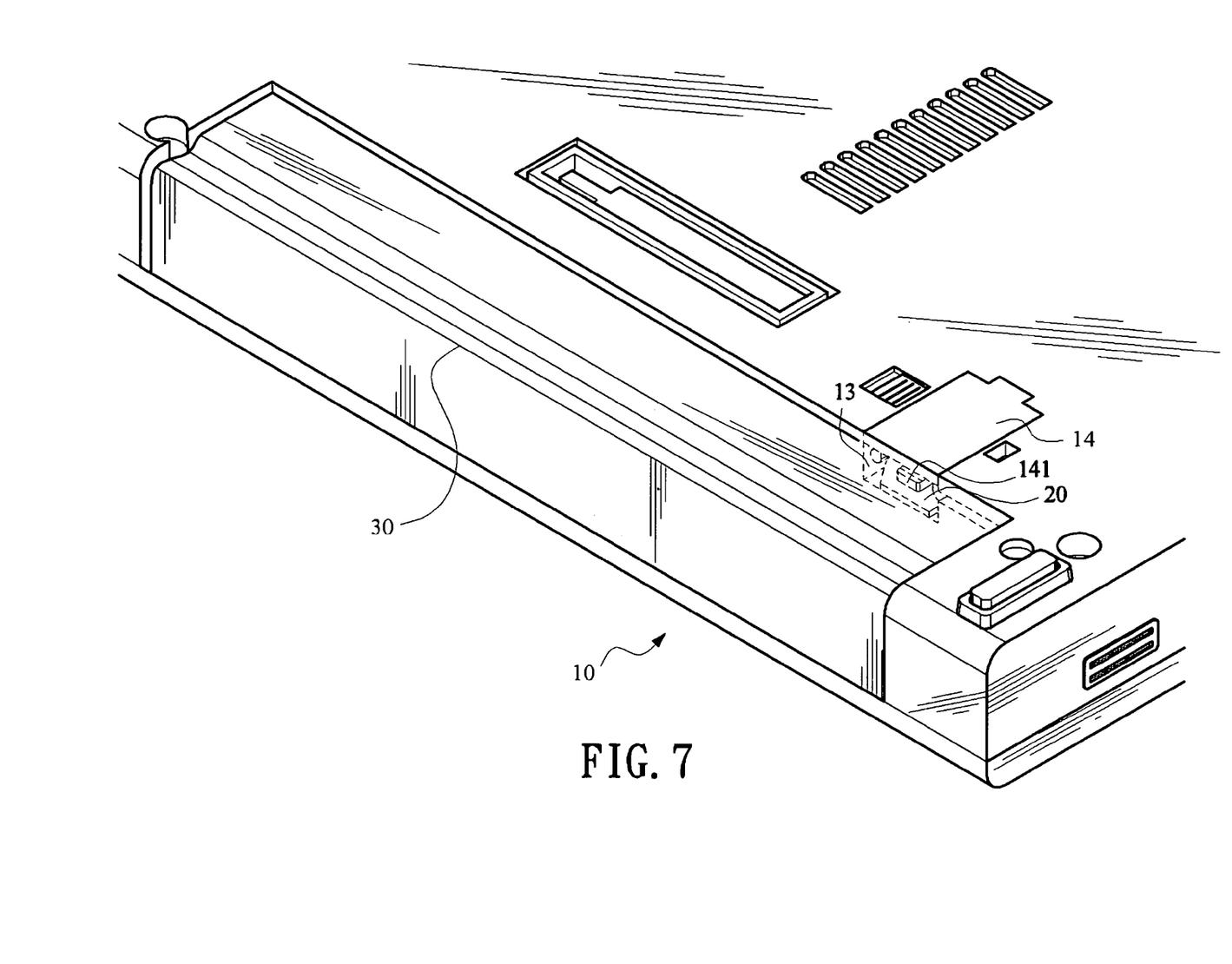
FIG. 7 is a schematic view of a third embodiment of the card insertion structure of an electronic device according to the present invention.

Additionally, following the card insertion structure of the above electronic device, referring to FIG. 7, with regard to a third embodiment of the card insertion structure 10 of the electronic device, the first cover 12 is replaced with only one power supply element 30 and is directly accommodated in the accommodating groove 11. That is, without the first cover 12, the power supply element 30 can also be used to provide power for the operation of the electronic device 1. Therefore, in the same operation manner as above, being in the accommodating groove 11, the power supply element 30 catches the second cover 14 to be in the covered position M1 to prevent the second cover 14 from being pivoted and thus avoid the card being ejected arbitrarily. Moreover, when the power supply element 30 is moved out and the second cover 14 is pivoted from the covered position M1 to the card ejection position M2, the pushing member 15 pushes the card 20 to move out of the insertion position S1 as the electronic device 1 is shut down, so the card may not be damaged.

The aforementioned power supply element 30 is a battery. Furthermore, the card 20 is one that can be plugged when the electronic device 1 is shut down (i.e., when the power supply element 30 is taken out to shut down the operation of the electronic device 1). Such a card is a non-hot-plug card or an SIM card; or, the card 20 is a hot-plug card.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A card insertion structure of an electronic device, for inserting a card, the card insertion structure comprising:
   an accommodating groove, caved in the electronic device;
   a first cover, covered on the accommodating groove;
   a card slot, formed by depressing in a wall of the accommodating groove and providing an insertion position for inserting the card;
   a second cover, pivotally disposed on the electronic device and pivoted between a covered position and a card ejection position, wherein when the first cover is covered on the accommodating groove, the first cover catches the second cover to be in the covered position; and
   a pushing member, disposed on the second cover, wherein when the second cover is pivoted from the covered position to the card ejection position, the pushing member pushes the card to move out of the insertion position.

2. The card insertion structure of an electronic device as claimed in claim 1, wherein the second cover has a stopper extending to the accommodating groove and caught by the first cover when the first cover is covered on the accommodating groove, so as to make the second cover in the covered position.

3. The card insertion structure of an electronic device as claimed in claim 1, wherein the card insertion structure further comprises a guide block disposed in the card slot for guiding the card to enter and be inserted into the card slot.

4. The card insertion structure of an electronic device as claimed in claim 1, wherein the card insertion structure further comprises at least one blade spring disposed in the card slot and pressing the card to be in the insertion position when the card is inserted into the card slot.

5. The card insertion structure of an electronic device as claimed in claim 1, wherein when being in the insertion position, the card is electrically connected to the electronic device.

6. The card insertion structure of an electronic device as claimed in claim 1, wherein the card is one which is plugged when the electronic device is shut down.

7. The card insertion structure of an electronic device as claimed in claim 1, wherein the card is a subscriber identity module (SIM) card.

8. The card insertion structure of an electronic device as claimed in claim 1, wherein the card is a hot-plug card.

9. The card insertion structure of an electronic device as claimed in claim 1, wherein the second cover has at least one clamping portion, the electronic device has a through hole for a rotating shaft to pass through, and the clamping portion clamps the rotating shaft to make the second cover pivoted to the first cover.

10. The card insertion structure of an electronic device as claimed in claim 1, wherein the second cover further comprises at least one hook portion fastened to the card slot when the first cover is covered on the accommodating groove, so as to make the second cover in the covered position.

* * * * *